March 11, 1952   J. C. BAISCH   2,588,952
FUEL SUPPLY SYSTEM
Filed Dec. 7, 1945                               3 Sheets-Sheet 1
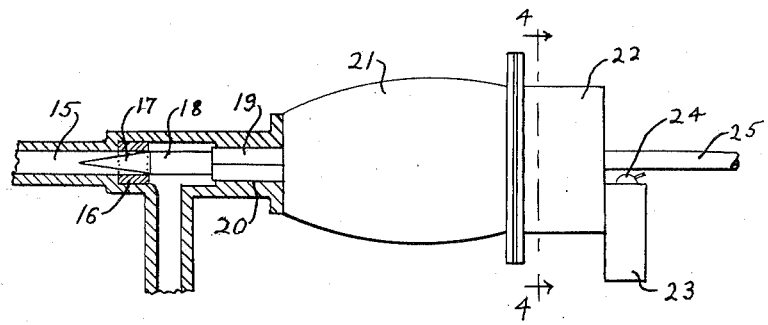
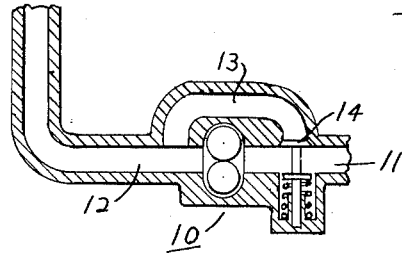
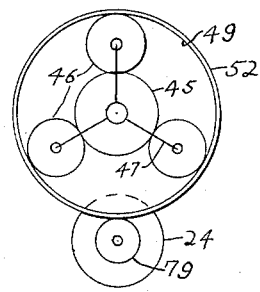
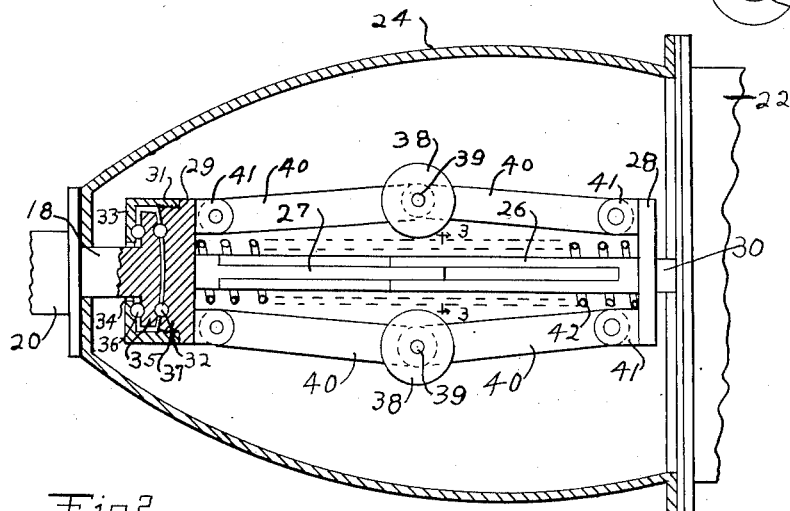
INVENTOR.
J. C. Baisch March 11, 1952 J. C. BAISCH 2,588,952
FUEL SUPPLY SYSTEM
Filed Dec. 7, 1945 3 Sheets-Sheet 2
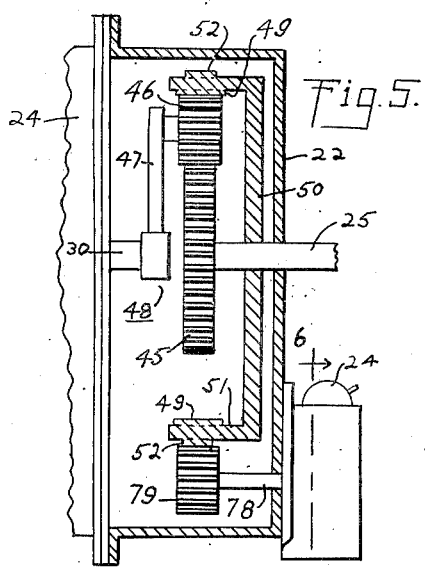
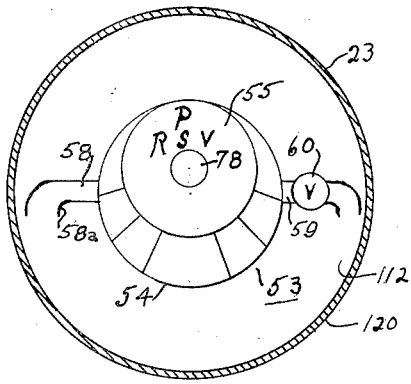
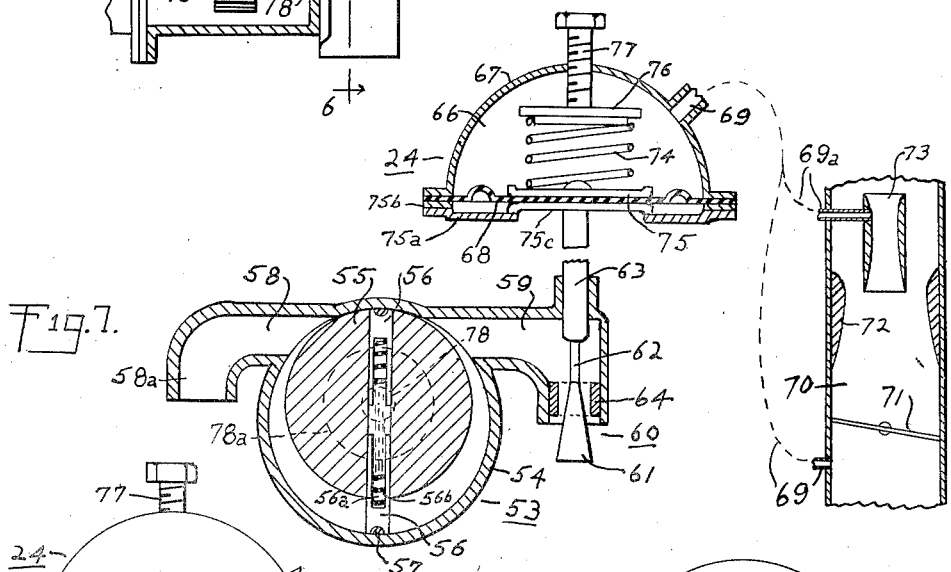
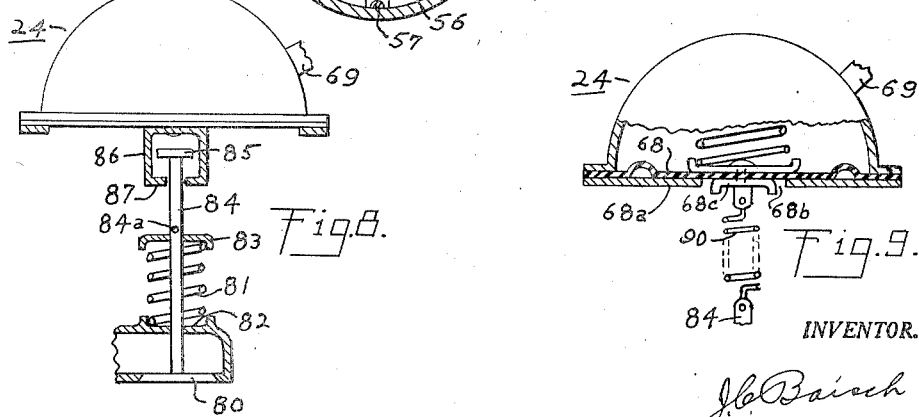
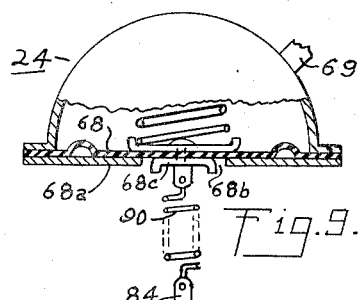
INVENTOR.
J.C. Baisch

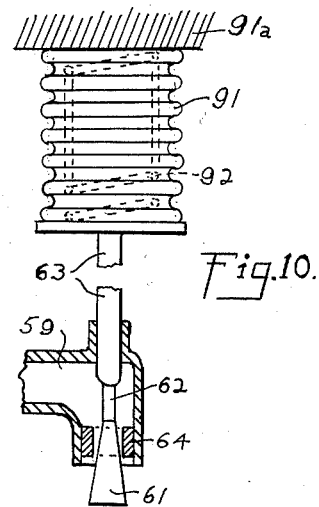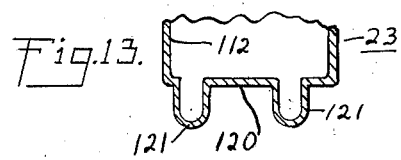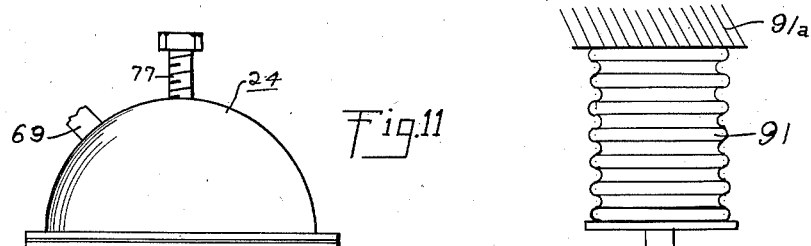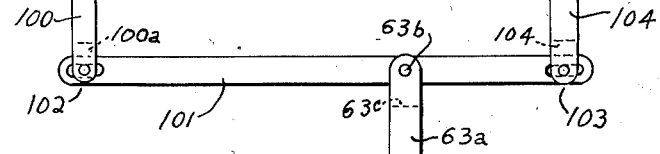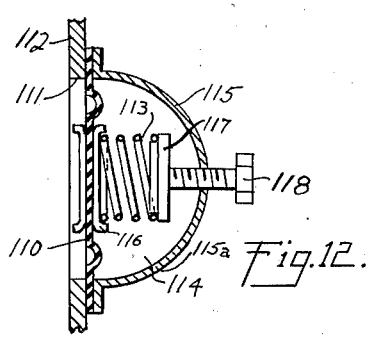

Patented Mar. 11, 1952

2,588,952

UNITED STATES PATENT OFFICE 2,588,952

FUEL SUPPLY SYSTEM

John Carroll Baisch, Los Angeles, Calif., assignor to Carter Carburetor Corporation, St. Louis, Mo., a corporation of Delaware Application December 7, 1945, Serial No. 633,441

3 Claims. (Cl. 123—119)

This invention relates generally to fuel supply systems and relates more particularly to fuel systems wherein the fuel is supplied under positive pressure.

While the invention has utility as a fuel supply system for various devices, it is particularly useful in connection with internal combustion engines, and is shown and described in such connection.

It is an object of the invention to provide a device of this character which will provide the proper quantity of fuel for the engine fuel mixture under various operating conditions.

This is effected in the present invention by controlling the supply of fuel in accordance with operating variables such as, for example, engine speed, engine charging pressure or manifold pressure, air flow in said manifold, temperature, and barometric pressure. In the present device there is variable metering means which is responsive to engine speed and this means is in turn controlled by means responsive to one or more of the other operating variables.

Other objects of the invention are to provide novel control means for the speed responsive means; to provide in said speed responsive means, means for effecting circulation and cooling of the fluid therein or effecting either of these functions; and to provide means for compensating for changes in the volume of said fluid under various temperature conditions or the like.

Other objects and advantages of the invention will be apparent from the following part of the specification.

In the drawings, which are for illustrative purposes only,

Figure 1 is a diagrammatic view, partially in section, of a fuel system embodying the present invention;

Figure 2 is an enlarged diagrammatic view, partially in section, of the speed responsive means of the present invention;

Figure 3 is a sectional view taken on line 3—3 of Figure 2;

Figure 4 is a diagrammatic end view of an epicyclic or planetary gear system used in the present invention, as viewed on line 4—4 of Figure 1;

Figure 5 is an enlarged sectional view of the same;

Figure 6 is an enlarged diagrammatic view of the fluid control means taken on line 6—6 of Figure 5;

Figure 7 is an enlarged diagrammatic view of the fluid control means and the means for regulating or controlling said means;

Figure 8 is a fragmentary view, partially in section, of an alternative arrangement of the engine charging pressure responsive means and fluid valve control means;

Figure 9 is a fragmentary view, partially in section, of another alternative arrangement;

Figures 10 and 11 are fragmentary views of other alternative arrangements;

Figure 12 is a sectional view of a volume compensating device for the fluid control means, said device being shown diagrammatically;

Figure 13 is a diagrammatic sectional view of the fluid control means housing showing cooling fins which may be used;

Figure 14 is an end view of a nozzle which may be used to improve fluid circulation in the housing of the fluid control means; and Figure 15 is a side view of said nozzle.

Referring to Figure 1, the fuel supply system, as shown, includes a fuel supply pump, indicated generally at 10, which receives fuel from an inlet conduit 11, connected to a suitable source of fuel, not shown, and delivers said fuel through an outlet conduit 12. The pump may be operated by any suitable means, such as the engine, for example, and is of the type which supplies fuel under positive pressure. The pump may be of any well known type and is shown as capable of delivering fuel at a substantially constant pressure (although it may have other delivery characteristics), there being a by pass 13 controlled by a pressure responsive valve 14. The conduit 12 is connected with a conduit 15 which leads to the induction passage of the engine. If desired a pressure operable nozzle, not shown, of any well known type may be provided, adjacent the discharge end of the conduit 15, which functions in the well known manner.

Variable metering means for controlling the flow of fuel to the engine is provided and as shown comprises a calibrated metering jet 16, the effective area of which is controlled by a longitudinally movable valve 17 which has a stem 18. The valve may be contoured as shown, or it may be otherwise, contoured, if desired, to provide different metering characteristics than that provided by said valve as shown. Means for preventing rotation of the valve is provided and, as shown, comprises a stem portion 19 of non-circular cross sectional shape, slidable in a guide 20 of similar cross sectional shape. In the present instance the stem portion 19 is shown as being square in cross section.

The valve 17 is controlled by variable speed means which includes means responsive to engine speed, shown in Figure 2 as a centrifugal control, located in a housing 21 and means for varying the speed of the control relative to engine speed, namely, an epicyclic or planetary gear train, the last mentioned means being located in a housing 22, Figure 1. The gear train transmission is in turn controlled by braking or snubbing means in a housing 23 and said braking or snubbing means is controlled by a device 24 which, as shown in Figure 1, is responsive to engine charging pressure. The valve control means is operated by a shaft which is indicated at 25 and is operably connected to the engine or other operating means, not shown.

Referring now to Figure 2, the centrifugal control is shown as being of the fly ball type, although any other suitable type of speed responsive device may be used. The control includes a stem having a pair of telescoping members 26 and 27 secured adjacent their outer ends to respective members 28 and 29. The member 28 is secured to a drive shaft 30 rotatable by the engine and fixed against longitudinal movement. Means for connecting the member 29 to the end of the valve stem 18 opposite the valve 17 is provided and as shown comprises a cap 31 which is threaded onto a reduced diameter portion 32 of said member 29. The bottom 33 of the cap is spaced from the adjacent end of the member 29 and has an opening 34 therein for reception of the valve stem 18. A head 35 on the end of said valve stem is disposed in the space between the bottom 33 of the cap and the adjacent end of the member 29 and ball bearings 36 and 37 are provided between said head 35 and the bottom 33 and adjacent end of member 29 respectively, to thereby provide free rotary movement of the centrifugal control, the valve stem being held against rotation by the portion 19 thereof so as to prevent undue wear of the valve 17, or the jet 16 or both.

The control also includes a pair of weights 38 disposed on opposite sides of the telescoping control stem and to each weight is pivotally secured, at 39, the adjacent ends of oppositely disposed links 40. The opposite ends of said links being pivotally secured to ears 41 attached to the members 28 and 29 respectively. The member 29 is urged to its outward limit of movement by yielding means, shown as comprising a spring 42 which reacts between said members 28 and 29.

Upon rotation of the shaft 30 centrifugal force causes the weights 38 to move outwardly relative to the axis of the telescoping stem of the governor, thereby causing member 29 to move toward the member 28 and effect opening movement of the valve 17, said movement being to the right as shown in the drawings.

With this arrangement the effective area of the orifice 16, which may be termed a variable metering orifice or jet, is controlled substantially in proportion to the square of engine speed. As the quantity of fuel which will flow through a metering orifice of a given size will vary in proportion to the square root of the differential of pressures on opposite sides thereof and as the size of the orifice is varied in accordance with the square of engine speed, it will be apparent that the above described arrangement provides a fuel control wherein the quantity of fuel supplied to the engine through the metering jet or orifice 16 will vary directly as the engine speed.

Means to vary the quantity of fuel supplied to the engine in accordance with manifold or engine charging pressure is also contemplated by the present invention and is effected by varying the speed ratio of the governor relative to engine speed as a function of said manifold or engine charging pressure. In the present case this means is shown as comprising a variable speed control device between the engine driven shaft 25 and the centrifugal control, which device is controlled by mechanism including a device responsive to said engine charging pressure or manifold pressure.

The pressure responsive control device comprises a planetary type of gear system (Figures 4 and 5) although it is to be understood that other types of gear systems may be used (for example a differential gear system) wherein the speed ratio between a driven member or shaft may be varied relative to the speed of a drive member or shaft. In the present instance this variable speed control device is of the infinitely variable type.

As shown in Figures 4 and 5, a sun gear 45 is attached to shaft 25. A plurality of planetary gears 46 are rotatably mounted on respective arms 47 of a spider, indicated generally at 48, which is attached to the shaft 30. The planetary gears are meshed with the sun gear and with the internal teeth 49 of an outer gear which comprises a drum 50 rotatably mounted on the shaft 25. The drum flange 51, which carries said internal teeth 49 also have external teeth 52.

As is generally known, when the drum is free to rotate, rotary movement of the sun gear will not impart movement to the spider carrying shaft. However, should the rotation of the drum be restricted or braked, or should said drum be held stationary, the spider and the shaft to which it is attached will rotate, the speed of rotation of said shaft depending upon the degree of braking of the drum. The speed of said spider carrying shaft will, of course, be at its maximum, for a given speed of the sun gear, when the drum is held stationary.

The means for snubbing or braking the drum 50 is shown as comprising a fluid pump, indicating generally at 53, and located in the housing 23. The fluid for the pump 53 substantially fills the housing 23 and may be a liquid such as oil or it may be of any other character, there being well known transmission fluids on the market which may be used. The fluid may be of a character which will not congeal or become viscous at low temperatures or it may be of a character which tends to congeal at said low temperatures. Fluid of the latter character has a use which will be described hereinafter.

The pump 53 may be of any suitable type but is shown in Figures 6 and 7 as being of the rotary, sliding vane type having a stator or casing 54 within which is operably disposed a rotor 55 having vanes 56 extending radially thereof. The interior ends of the vanes 56 have recesses 56a and a spring 56b, reacting between the bottoms of said recesses, urges the vanes outwardly of the rotor and urges the outer ends thereof into engagement with the interior wall of the stator. The ends of the vanes may be provided with sealing members 57, if desired. An extension 78a may be provided on one end of the rotor and mounted in a bearing, not shown.

The stator has an inlet passage 58 and an outlet passage 59, said passages being arranged to communicate with the interior of the stator on opposite sides thereof so that there is a vane interposed therebetween at all times. The rotor, in the arrangement shown, is eccentric with the axis of the stator and is in engagement with the interior wall thereof at a point between the inlet and outlet thereof, said engagement of the rotor with the stator wall being of such character as to permit proper operation of the device.

The outlet passage 59 is controlled by a valve which may be of any suitable type adapted to control the flow of fluid through a conduit or passage. As shown, the valve, indicated generally at 60, comprises a conical movable valve member 61 having a stem 62 connected to an enlarged portion 63, the valve member 61 being adapted to control the flow of fluid through a calibrated orifice or jet 64.

If desired the pump discharge may be in a direction to promote circulation of fluid within the casing 23, as shown in Figure 6, and the inlet end of the inlet passage 58 may be turned, as at 58a, in a direction facing the direction of circulation of said fluid.

While the valve 61 is shown as being conical in shape it may be otherwise contoured to get other control characteristics than that provided by the conical member.

Means for controlling the valve 61 is shown as comprising the device 24 which is responsive to engine charging pressure. This device comprises a chamber 66 defined by a casing 67 and a diaphragm 68 to which the enlarged end portion 63 of the valve stem is attached. The chamber 66 is connected by a conduit 69 to the induction conduit, indicated generally at 70, of the intake manifold of the engine. As shown this connection is posterior to the throttle valve 71. Preferably the connection is also provided with a venturi in the induction passage, as by conduit 69a, venturis being shown at 72 and 73 anterior to the throttle. A spring 74 urges the valve in the opening direction and reacts against a spring retainer 75 secured to the inner face of the diaphragm 68 and a spring retainer 76 within the chamber 66, the latter retainer being adjustable by means of a screw 77 to vary the effective force of said spring 74.

The diaphragm 68 is marginally clamped between a flange of the casing 67 and a ring 75b and means for limiting spring urged movement of the valve may be provided. Such limiting means is shown as comprising a plate 75a secured to the assembly beneath the ring 75b. The plate 75a is provided with a central opening through which the stem portion 63 extends, and a washer secured to the diaphragm on the lower side thereof, is adapted to abut against the plate 75a, thus limiting said spring urged movement of the valve.

The rotor 55 is operably connected to the drum 50 by means of a shaft 78 having a gear 79 attached thereto and meshed with the external teeth 52 of said drum.

By varying the position of the valve member 61 the amount of work which the pump must do is varied and the discharge of said pump may be infinitely varied, as desired. When a liquid, which is non-compressible, is used in the casing 23 and the valve 60 is closed the rotor is held stationary and as said valve is opened to any given position the rotor will rotate accordingly. Further, the rotation of the drum will also accordingly be controlled as will that of the centrifugal governor. When the valve 60 is closed, in this arrangement, the drum will be held against rotation so that the maximum speed of the centrifugal control will be effected for a given engine speed. Likewise, as the position of valve member 61 is varied the speed of rotation of the control relative to engine speed will be varied.

Moreover, as the position of the valve member 61 is controlled by manifold or engine charging pressure the speed of said centrifugal control is thus varied in accordance with manifold or engine charging pressure.

As shown herein, the valve member 61 is moved toward open and closed positions respectively as the manifold pressure posterior to the throttle valve increases or decreases in value. At low manifold pressures the quantity of fuel supplied to the engine will be increased for increasing the quantity of fuel to the air in the fuel mixture as is required for idling and for high speeds and power. At engine speeds or operating conditions not requiring fuel enrichment the valve member 61 is held in the position required to provide the proper mixture ratio by the abutment of washer 75c against the plate 75.

In case the alternative arrangement wherein the conduit 69a is used in connection with conduit 69 the former will modify the action of the manifold pressure posterior to the throttle valve by bleeding air to the chamber 66 at low air flows in the venturi, and at higher air flows will cooperate with said manifold pressure in urging the valve in the closing direction. Also, should the chamber 66 be connected only to the venturi 73 anterior to the throttle the valve member 61 will be controlled solely in accordance with the pressure within said venturi. With this arrangement there will be the desired fuel mixture enrichment for power operation of the engine.

In the alternative arrangement shown in Figure 8 the outlet of passage 59 is controlled by a valve 80 which is urged in the closing direction by a spring 81 reacting between a spring retaining portion 82 of the outlet conduit and a spring retainer 83 secured to the stem 84 by a pin 84a. The free end of valve stem 84 is provided with a head 85 which is located within a bracket 86 attached to the diaphragm 68 and which is adapted to be engaged by inturned arms 87 of said bracket 86.

With this arrangement the valve 80 is yieldingly urged in the closing direction by the spring 81 which is of such character as to permit opening of the valve by the differential of pressure thereacross when the device is operating. However, when manifold pressure or engine charging pressure is low the diaphragm is moved in an upwardly direction, as shown in Figure 8, causing arms 87 to engage the head 85 and urge the valve 80 in the closing direction to thereby effect modification of the speed of the governor and consequently vary the quantity of fuel supplied to the engine for a given engine speed.

In the arrangement shown in Figure 9 there is a yielding connection 90, shown as a spring, between the diaphragm and the valve stem 84. One end of the spring 90 is attached to said valve stem 84 while the opposite end is connected to an ear portion of a washer element 68c attached to the diaphragm 68. The diaphragm is limited in its outward movement by a plate 68a secured to the casing 67 and marginally securing said diaphragm to said casing. The washer element 68c is received in an opening 68b in said plate 68a.

In Figure 10 another alternative arrangement is shown wherein the position of the valve member 61 is controlled by means responsive to barometric pressure. This means is shown as comprising an evacuated bellows 91 having a balancing spring 92 therein of well known character and function and the movable end of said bellows is attached to the stem 63 of the valve member 61. As barometric pressure drops the bellows will expand and effect a reduction in the quantity of fuel supplied for the fuel mixture to compensate for the reduction in the weight of the air, and the reverse will occur as barometric pressure increases. It is to be understood, of course, that other well known types of devices which are responsive to barometric or atmospheric pressure may also be used. Such devices may also be responsive to temperature changes, as is well known in the art, by providing therein a suitable quantity of one of the well known liquids. Or, if desired, the device may be solely responsive to temperature and may be placed at some location where it is subject to engine temperatures or some part that is representative of engine temperature.

In Figure 11 there is shown an arrangement wherein the position of valve 61 is controlled in accordance with both manifold pressure and barometric pressure and/or temperature.

The manifold pressure responsive device 24 is provided with a member 100 attached at one end to the diaphragm thereof and which is pivotally attached at the other end to a link or beam 101, adjacent one end thereof, by a pin and slot connection 102. The other end of said beam is pivoted, by a pin and slot connection 103, to a member 104 secured to the movable end of bellows 91. Intermediate its ends the beam 101 has a pivotal connection 63b with stem 63a of the valve member 61. It is to be noted that the members 100 and 104 and valve stem 63a have their respective ends slotted at 100a, 104a and 63c for operative reception of the beam 101. Thus the valve 61 is controlled by both manifold or engine charging pressure and barometric or atmospheric pressure.

Another means for effecting control of the device as a function of temperature is to provide a liquid such as of oil or the like in the casing 23 which tends to congeal at low temperatures and locating the casing, with the pump mechanism therein, adjacent a part of the engine which becomes heated as the engine operates, or in association with or adjacent to some part of the engine or power plant system which has temperatures representatvie of engine temperature.

When the engine has become cold while standing inoperative under low temperature conditions the oil will become viscous or congealed. Then, when the engine is started the viscous or congealed oil will offer increased resistance to the rotation of the rotor 55 relative to the normal conditions of operation and the valve 17 will therefore be opened a greater amount than under normal temperature conditions so that the fuel mixture for the engine is correspondingly enriched.

As the engine warms up the liquid in the casing and pump will become more and more fluid until it reaches its normal condition of fluidity at normal operating temperatures. Thus the fuel mixture will be gradually leaned as the engine warms up and will become normal at normal engine temperatures.

With an arrangement of this kind the valve 61 may be so controlled that at normal operating conditions it would not be fully closed even under idling or power conditions so that under low temperature conditions the mechanism would effect the high degree of mixture enrichment required for starting and warming up operation of the engine.

Means for compensating for variations in the volume of the fluid or liquid in casing 23 may be provided so that the casing may be fully filled with liquid. One such means is shown in Figure 12 as comprising a diaphragm 110 disposed over an opening 111 in an end wall 112 of said casing 23. A spring 113, in chamber 114, formed by said diaphragm and a housing 115 covering the outer side of said diaphragm and marginally securing same to said wall 112, urges the diaphragm inwardly. The spring 115 reacts between a spring retainer 116 attached to diaphragm 110 and a spring retainer 117 which is adjustable by means of a screw 118 so that the effective force of said spring may be varied. A vent 115a may be provided for the chamber 114 to prevent undesirable pressures in said chamber which would interfere with the proper functioning of the volume compensating means. Thus, with the casing 23 filled with fluid, variations in the volume of said fluid, due to changes in temperature or the like, will be accommodated. This arrangement also tends to reduce foaming of the fluid or liquid in the housing by maintaining the same under pressure.

Should it be desired to increase the cooling of the liquid in the housing the peripheral wall 120 of said housing may be provided with hollow fins 121 which increase the heat transfer area for the fluid. Also, if desired, the discharge end of the outlet passage may be provided with a wide nozzle 122 having an elongated outlet 123, thereby promoting circulation of the fluid in said casing.

It is to be understood, of course, that the features above described, may be variously combined to meet the requirements of various installations.

I claim:

1. In a fuel system for an internal combustion engine, a source of fuel under substantially constant superatmospheric pressure, a device actuable according to engine speed, variable metering means controlling the delivery of fuel from said source to the engine, an epicyclic gear train transmission between said device and said metering means, and means responsive to engine charging pressure and temperature for braking said gear train to vary the speed ratio of said transmission and, consequently, the operative response of said metering means relative to engine speed.

2. In a fuel system for an internal combustion engine: a source of fuel for the engine; metering means controlling the supply of fuel to the engine from said source, engine speed responsive means including a centrifugal device connected to said metering means to actuate the same, a differential speed transmission interposed between the engine and said speed responsive means, a fluid pumping device, actuable by said transmission and functioning as a brake to vary the operative response of the speed responsive means relative to the speed of the engine in accordance with the work being done by said pumping device, said fluid pumping means having an inlet and an outlet, a valve controlling said outlet; and means responsive to variable conditions in the induction passage for controlling said valve.

3. A fuel metering means for an internal combustion engine comprising a source of fuel under super-atmospheric pressure, a passage for conducting liquid fuel from said source to the engine, a metering valve in said passage controlling the delivery of fuel therethrough, a centrifugal governor connected to said valve for actuating the same, an epicyclic gear train connected to said governor, said train having a sun gear for rotation by the engine, planetary gearing operable about said sun gear and with a driving connection to said governor, and an outer, toothed wheel meshing with said planetary gearing, a fluid pump brake driven by said outer wheel, an outlet restriction for said pump, means to vary the effective size of said restriction, and means responsive to induction conduit conditions to adjust said last mentioned means so as to vary the resistance to rotation of said outer toothed wheel and, thereby, vary the response of said metering valve to said governor.

JOHN CARROLL BAISCH.

REFERENCES CITED

The following references are of record in the file of this patent:

UNITED STATES PATENTS

| Number | Name | Date |
|---|---|---|
| 794,192 | Seal | July 11, 1905 |
| 1,161,066 | Minor | Nov. 23, 1915 |
| 1,247,548 | Kolarik | Nov. 20, 1917 |
| 1,928,244 | Berlin | Sept. 26, 1933 |
| 2,179,628 | Heinzelmann | Nov. 14, 1939 |
| 2,245,562 | Becker | June 17, 1941 |
| 2,341,257 | Wunsch | Feb. 8, 1944 |
| 2,410,773 | Chandler | Nov. 5, 1946 |
| 2,422,808 | Stokes | June 24, 1947 |